US006831638B2

(12) United States Patent
Praun et al.

(10) Patent No.: US 6,831,638 B2
(45) Date of Patent: Dec. 14, 2004

(54) METHOD AND APPARATUS FOR GENERATION OF CONSISTENT PARAMETERIZATIONS FOR A SET OF MESHES

(75) Inventors: Emil C. Praun, Princeton, NJ (US); Peter Schroeder, Pasadena, CA (US); Wim Sweldens, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 315 days.

(21) Appl. No.: 10/075,793

(22) Filed: Feb. 14, 2002

(65) Prior Publication Data

US 2002/0143419 A1 Oct. 3, 2002

Related U.S. Application Data

(60) Provisional application No. 60/269,016, filed on Feb. 15, 2001.

(51) Int. Cl.$^7$ ............................................... G06T 17/00

(52) U.S. Cl. ....................... 345/419; 345/420; 345/423

(58) Field of Search ................................. 345/419, 420, 345/423, 426, 427, 428, 581, 582, 589, 629, 634, 646, 647, 473, 474, 475, 706

(56) References Cited

PUBLICATIONS

Guenter et al., "Making Faces", In Computer Graphics (SIGGRAPH 1998 Proceedings), pp. 55–67, Jul. 1998.*

* cited by examiner

*Primary Examiner*—Almis R. Jankus (57) ABSTRACT

Techniques are disclosed for generating consistent parameterizations for a set of meshes each of which includes data points representative of a corresponding surface. The consistent parameterizations preferably share the same base domain, and are generated using a net tracing algorithm. The net tracing algorithm involves determining for each of the meshes a net of paths having a connectivity substantially the same as that of the base domain. In an illustrative embodiment, the net tracing algorithm as applied to a given one of the meshes includes determining, for each edge in the base domain, a tentative path for use in the net of paths corresponding to the mesh. The tentative paths are then prioritized based on length, and selected ones of the tentative paths are used to construct a spanning tree of the base domain. One or more swirl detection operations are preferably performed as part of the spanning tree construction, with the results of the swirl detection operations being utilized in selecting particular ones of the tentative paths for use in the spanning tree. The net of paths is completed by adding one or more additional paths to the spanning tree, followed by applying a straightening operation to one or more of the paths in the net. The consistent parameterizations can be utilized to generate same-connectivity remeshes of the original meshes, which considerably facilitates subsequent digital geometry processing (DGP) operations.

20 Claims, 5 Drawing Sheets

METHOD AND APPARATUS FOR GENERATION OF CONSISTENT PARAMETERIZATIONS FOR A SET OF MESHES

PRIORITY CLAIM

The present application claims the priority of U.S. Provisional Application No. 60/269,016, filed Feb. 15, 2001 in the name of inventors Emil C. Praun, Peter Schroeder and Wim Sweldens and entitled "Consistent Mesh Parameterizations," which is incorporated by reference herein.

FIELD OF THE INVENTION

The present invention relates generally to techniques for processing data representative of surfaces having an arbitrary topology, and more particularly to processing techniques which utilize a mesh of interconnected data points to characterize a surface in three or more dimensions.

BACKGROUND OF THE INVENTION

Dense meshes of interconnected data points are used to represent surfaces of arbitrary topology in numerous applications. For example, such meshes routinely result from three-dimensional data acquisition techniques such as laser range scanning and magnetic resonance volumetric imaging. These meshes are often configured in the form of a large number of triangles, and typically have an irregular connectivity, i.e., the vertices of the mesh have different numbers of incident triangles. Because of their complex structure and potentially tremendous size, dense meshes of irregular connectivity are difficult to handle in such common processing tasks as storage, display, editing, and transmission.

It is known that multiresolution representations of dense meshes can be used to facilitate these processing tasks. For example, U.S. Pat. No. 6,285,372, issued Sep. 4, 2001 in the name of inventors L. C. Cowsar et al. and entitled "Multiresolution Adaptive Parameterization of Surfaces," which is incorporated by reference herein, discloses particularly efficient and advantageous techniques for generation of a multilevel parameterization which maps points in a coarse base domain mesh to points in an irregular connectivity dense mesh.

Digital geometry processing (DGP) is the field concerned with the construction of signal processing style algorithms for meshes. A basic element of DGP algorithms is the establishment of a smooth parameterization for a given mesh. Due to the non-Euclidean nature of the mesh, the construction of DGP algorithms is fundamentally more difficult than the construction of classical signal processing algorithms for one-dimensional, two-dimensional and three-dimensional signals. For example, sound (1D), images (2D) and video (3D) are readily parameterized onto a Euclidean space. More particularly, with regard to images, such signals are always sampled using a Cartesian grid, and are specified by an irradiance function over a section of the 2D plane. As a result, is it easy to perform operations such as averaging two images or computing the norm of their difference. Unfortunately, the same is not true for meshes, due to their non-Euclidean nature and generally differing sampling patterns and connectivity.

DGP algorithms involving different meshes generally require a common parameterization and a common sampling pattern for each of the meshes. Computing a global parameterization and a corresponding remesh for a dense mesh is a difficult problem in itself and has received considerable attention since it is a fundamental step in many algorithms from texture mapping and shape blending to physical simulation, compression, and data analysis.

Conventional parameterization algorithms often start with a triangle mesh having irregular connectivity, and generate therefrom a set of patches or a semi-regular mesh. Another known technique, described in the above-cited U.S. Pat. No. 6,285,372, employs mesh simplification with constraints to accommodate any user supplied data in the construction of the parameterization during an otherwise fully automatic process.

None of the above-noted approaches have adequately addressed the issue of building parameterizations for different meshes simultaneously. This problem arises naturally in the context of morphing when a mapping correspondence between two different meshes is the explicit goal. A technique described in A. Lee et al., "Multiresolution Mesh Morphing," Proceedings of SIGGRAPH '99, pp. 343–350, 1999, which is incorporated by reference herein, independently establishes parameterizations for two different meshes and then solves the correspondence problem on the base domains. However, the two parameterizations are not consistent, that is, the base domains of the two parameterizations are different. Moreover, the technique is not readily extendible to n-way simultaneous parameterizations, i.e., generation of consistent parameterizations for any desired number n of meshes.

Another technique, described in S. Marschner et al., "Modeling and Rendering for Realistic Facial Animation," Rendering Techniques 2000: 11th Eurographics Workshop on Rendering, pp. 231–242, 2000, which is incorporated by reference herein, involves animating a number of different faces via a single, prototype patch layout. Since their prototype face, i.e., the embedding of the prototype layout, is already very close to a given face, Marschner et al. report a simple least squares fitting procedure to work well. However, this simple least squares matching approach is generally not suitable for use in applications involving the simultaneous parameterization of meshes which are not geometrically similar.

It is therefore apparent that a need exists for techniques for generating consistent parameterizations for an arbitrary set of meshes.

SUMMARY OF THE INVENTION

The present invention provides techniques for generating consistent parameterizations for a set of meshes, e.g., irregular connectivity meshes representing surfaces of arbitrary topology.

By providing consistent parameterizations for a set of meshes, the invention greatly facilitates mesh processing operations in a wide variety of DGP applications, including, for example, principle mesh components analysis, transfer of textures or wavelet details between meshes, and shape blending.

In accordance with one aspect of the invention, consistent parameterizations are generated for a set of meshes each of which includes data points representative of a corresponding surface. The consistent parameterizations share the same base domain, and are generated using a net tracing algorithm. The net tracing algorithm involves determining for each of the meshes a net of paths having a connectivity substantially the same as that of the base domain.

In an illustrative embodiment of the invention, the net tracing algorithm as applied to a given one of the meshes includes determining, for each edge in the base domain, a tentative path for use in the net of paths corresponding to the mesh. The tentative paths are then prioritized based on length, and selected ones of the tentative paths are used to construct a spanning tree of the base domain. One or more swirl detection operations are preferably performed as part of the spanning tree construction, with the results of the swirl detection operations being utilized in selecting particular ones of the tentative paths for use in the spanning tree. The net of paths is completed by adding one or more additional paths to the spanning tree, followed by applying a straightening operation to one or more of the paths in the net.

In accordance with another aspect of the invention, the consistent parameterizations can be utilized to generate same-connectivity remeshes of the original meshes, thereby facilitating implementation of the above-noted DGP applications.

Advantageously, the techniques of the present invention overcome one or more of the previously-described problems associated with conventional approaches. For example, the invention may be utilized to provide n-way simultaneous parameterizations, and is suitable for use with meshes which are not geometrically similar.

DETAILED DESCRIPTION OF THE INVENTION

The present invention will be illustrated below in conjunction with exemplary processing techniques applied to three-dimensional surface data in the form of meshes of triangles. It should be understood, however, that the disclosed techniques are suitable for use with a wide variety of other representations of surface data and in numerous other applications. For example, the invention can be applied to surface data in forms other than a mesh of triangles, and can be applied to surface data of more than three dimensions. The term "mesh" as used herein refers to any set of interconnected data points which is representative of a surface. A "remesh" is a mesh which is generated from a base domain mesh using a parameterization. The term "parameterization" as used herein refers to any function or set of functions which specifies a mapping between at least a portion of the data points in one mesh, e.g., a base domain mesh, and data points in at least one other mesh that is less coarse. A "smooth parameterization" refers to a parameterization which has been subject to a smoothing operation. The term "path" is intended to include a curve, line or any other type of connection between two or more data points of a given mesh. The term "net" as used herein refers to a set of one or more paths.

1. Exemplary Mesh Processing System

Figure 1:
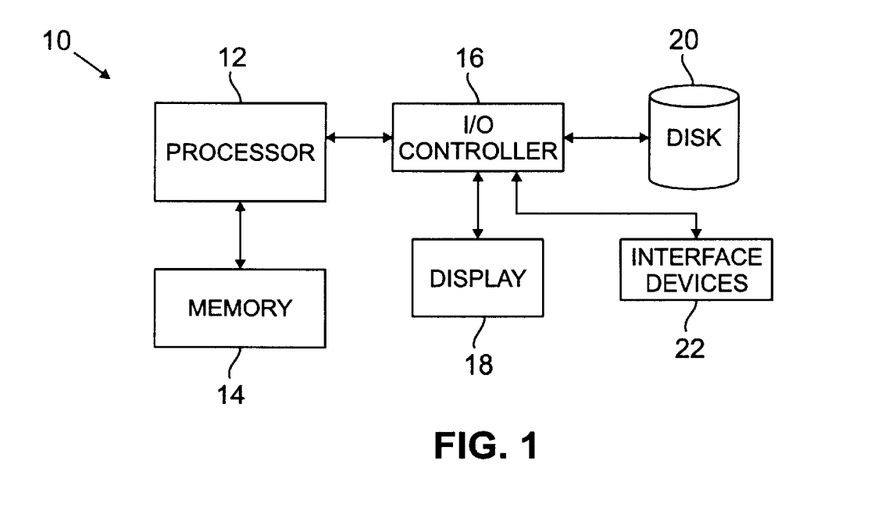
FIG. 1 is a block diagram of a system for processing meshes in accordance with the invention.

FIG. 1 shows an exemplary mesh processing system 10 in which the invention can be implemented. The system 10 includes a processor 12 coupled to a memory 14 and an input/output (I/O) controller 16. The I/O controller 16 in conjunction with the processor 12 directs the operation of a number of peripheral components including a display 18, a disk-based storage device 20 and one or more interface devices 22 which may include, for example, a printer, a keyboard and a network interface card. The elements 12, 14, 16, 18, 20 and 22 of system 10 may represent portions of a desktop or portable personal computer, a microcomputer, a workstation, a mainframe computer or other type of digital data processor, or suitable combinations thereof. The memory 14 and disk-based storage device 20 may be electronic, magnetic or optical storage devices, or portions or combinations of these and other memory devices.

The present invention may be implemented at least in part in the form of a computer software program stored in memory 14 or storage device 20. For example, such a program may be executed by processor 12 on input mesh data to produce a desired output mesh in a predetermined format on display 18. The program may be written in a conventional programming language such as C++ and may make use of standard computational geometry data structures such as those described in, e.g., E. P. Mucke, "Shapes and implementations in three-dimensional geometry," Tech. Rep. UIUCDCS-R-93-1836, University of Illinois at Urbana-Champaign, 1993, which is incorporated by reference herein. The input mesh data may be read from one or more files of disk-based storage device 20, or transmitted to the system 10 over a network connection such as, for example, an Ethernet connection or other suitable local area network (LAN) connection, the Internet or other global or wide area network (WAN), etc.

2. Generation of Consistent Mesh Parameterizations

The present invention in accordance with one aspect thereof provides techniques for generating consistent parameterizations for a set of meshes. The parameterizations are referred to herein as "consistent" because they share the same base domain. The parameterizations may also share certain designated feature points or edges, e.g., user-specified or automatically-identified feature points or edges, but this is not a requirement of the invention. Advantageously, the consistent parameterizations provide correspondence between different meshes and allow remeshes with the same connectivity. Such remeshes may be used to form the basis for a large class of DGP algorithms, including principal mesh component analysis, texture and wavelet detail transfer between meshes, and n-way shape blending.

In the illustrative embodiments to be described below, it will be assumed that the mesh parameterizations that are generated share the same base domain and designated feature points or edges. This implies that all meshes need to have the same genus. The illustrative embodiments will be directed to the genus zero, orientable manifold case, although this is by way of example only, and it will be appreciated by those skilled in the art that the described techniques are applicable to higher genus. Genus zero refers generally to a mesh without any tunnel or other hole therethrough. The genus number indicates the number of different holes through a given mesh, e.g., a donut-shaped mesh having a single hole therethrough is a genus one mesh, and the example three-holed torus mesh shown in the above-cited U.S. Pat. No. 6,285,372 is a genus three mesh. As indicated above, the techniques of the invention can be applied to meshes having genus zero, one, two, three or higher orders.

Figure 2:
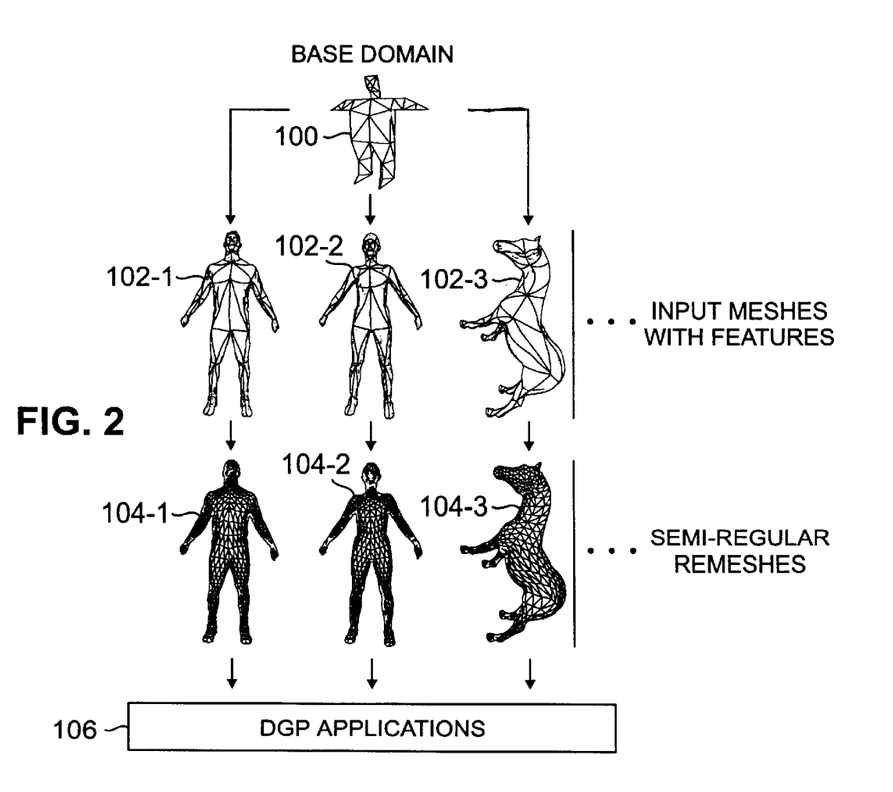
FIG. 2 illustrates a technique for generation of consistent mesh parameterizations in accordance with one aspect of the invention.

FIG. 2 illustrates the generation of consistent mesh parameterizations in accordance with the invention. In this case, multiple input meshes 102-1, 102-2, 102-3, . . . 102-n having designated features are each parameterized onto a base domain mesh 100. The base domain mesh 100 is also referred to herein as simply a "base domain." The latter term is intended to include a base domain mesh as well as any other suitable arrangement of information which specifies a base domain.

The resulting consistent parameterizations give immediate point correspondences between the meshes and allow the meshes to be remeshed with the same connectivity, i.e., to be remeshed such that every vertex in one remesh has a unique corresponding vertex in every other remesh. More particularly, the consistent parameterizations are used to generate corresponding semi-regular remeshes 104-1, 104-2, 104-3, . . . 104-n having substantially identical connectivity. The remeshes are then supplied to one or more DGP applications 106 for subsequent processing.

The invention in this embodiment thus takes multiple input meshes, which may be geometrically quite dissimilar, parameterizes these input meshes onto the same base domain, and then generates remeshes with identical connectivity for input to one or more DGP algorithms. Examples of the DGP algorithms that may be utilized in conjunction with the invention include n-way shape blending, transfer of textures, details, animation controls or other attributes, etc.

The base domain 100 may be specified by a user or determined automatically, e.g., by applying an existing parameterization technique to one of the input meshes 102. Each of the input meshes 102 in the illustrative embodiment of FIG. 2 will generally need to have features outlined or otherwise annotated either manually or through automatic feature identification. Once our algorithm computes consistent parameterizations, all meshes can be remeshed using identical connectivity.

The remeshes 104 in FIG. 2, as indicated previously, are semi-regular remeshes, i.e., meshes formed by recursive and possible adaptive regular refinement from the base domain 100. The use of semi-regular remeshes provides advantages such as simplified data structures, filtering, wavelet transforms and compressibility.

It should be noted that a given parameterization generated in accordance with the invention may be subject to one or more smoothing operations, using well-known conventional techniques. The resulting smoothed parameterization is intended to be encompassed by the general term "parameterization" as used herein.

The illustrative embodiments to be described herein, given a base domain and a set of orientable genus zero meshes with identified features, compute consistent parameterizations for all of them. As will be described in greater detail below, an algorithm for generation of consistent mesh parameterizations involves tracing on each mesh a net of paths that is provably topologically equivalent to the connectivity of the base domain. As mentioned previously, the meshes are not required to be geometrically close. Subsequently the parameterizations are used to compute remeshes with identical connectivity, as was described in conjunction with FIG. 2. Examples to be provided below illustrate how the resulting remeshes can be used in a wide variety of DGP applications.

In order to describe the above-noted algorithm for generation of consistent mesh parameterizations, the following terminology is introduced. It should be understood that the particular notations used, and any assumptions explicit or implicit therein, are by way of example only, and should not be construed as limiting the scope of the invention.

A triangle mesh M may be specified as a pair (P, K), where P is a set of N point positions $P=\{p_i=(x_i, y_i, z_i)\in R^3 | 1 \leq i \leq N\}$, and K is an abstract simplicial complex which contains all the topological, i.e., adjacency information. The complex K is a set of subsets of $\{1, \ldots, N\}$. These subsets come in three types: vertices $\{i\}$, edges $\{i,j\}$, and faces $\{i,j,k\}$. Two vertices $\{i\}$ and $\{j\}$ are neighbors if $\{i,j\}\in K$. The 1-ring neighbors of a vertex $\{i\}$ form a set $V(i)=\{j|\{i,j\}\in K\}$.

It will be assumed that a remesh generated from a mesh M is a semi-regular mesh, as was previously described in the context of the remeshes 104 of FIG. 2. For concreteness, we will further assume that such remeshes are built by repeated triangle quadrisection starting from a coarse irregular mesh $N_0=(Q_0, L_0)$ with the finer meshes denoted $N_j=(Q_j, L_j)$. However, nothing in the algorithm prevents the use of quadrilaterals or other geometric shapes instead of triangles, or the use of regular refinement procedures other than quadrisection.

A typical remeshing procedure starts from an irregular input mesh M and computes a base domain with connectivity $L_0$ as well as a bijective mapping between the base domain and M. This mapping is subsequently used to build the remeshes $N_j$ for j>0. Note that this can be done in an adaptive fashion if needed.

In the illustrative embodiments, we are given a set of meshes $S=\{M^m | 0 \leq m < M_{max}\}$, and the objective is to compute a semi-regular remeshing for all of the meshes in the set with a common base domain connectivity $L_0$. We also need to ensure that the individual parameterizations respect features as desired. As an example, consider meshes representative of a set of heads. Typically one would seek mappings that will respect features such as eyes, nose, ears, etc.

For convenience, we treat the common base domain as a special mesh $B=(P, L_0)$. Since this base domain does not have associated geometry, its vertex locations do not need to be in $R^3$. To each of the F feature vertices $b_f$ we simply give canonical locations in $R^F$. Let $b_f$ be the $f$-th basis vector, i.e., the $f$-th component is one and all others are zero.

Assume we have identified, either by hand or through a feature detection algorithm, F feature points in each of the meshes, with $p_f^m$ denoting the $f$-th feature point in the m-th mesh. Feature lines or edges can be treated in a similar manner. Furthermore, the connectivity $L_0$ between the feature points is also given. Each triangle in $L_0$ corresponds to a patch on each of the meshes $M^m$, while edges in $L_0$ correspond to patch boundaries, as illustrated in conjunction with the input meshes 102 of FIG. 2. We will refer to the layout of patch boundaries on the meshes $M^m$ as "nets." The task now is to trace these patch boundaries on each of the meshes $M^m$ between the points $p_f^m$ in a manner such that the resulting net is (1) topologically equivalent to $L_0$ and (2) outlines fair patches. The first constraint is easy to state and the illustrative algorithm described herein guarantees that it is satisfied. The second condition is more difficult to capture in an objective criterion and the illustrative algorithm uses a number of heuristics that produce fair patches in practice.

2.1 Topologically Equivalent Patch Boundaries

Given that both B and M are assumed to be orientable manifolds, two conditions need to be satisfied for the patch boundaries to be topologically equivalent with $L_0$:

1. Two patch boundaries may only intersect at a feature vertex.

2. Each feature vertex has a consistent rotational ordering of its edges in both B and M, as described in E. Akleman et al., "Guaranteeing 2-Manifold Property for Meshes," Proceedings of Shape Modeling International, pp. 18–25, 1999, which is incorporated by reference herein.

It is tempting to simply trace shortest paths on M for each edge in $L_0$, e.g., by employing a standard "brush fire" algorithm such as that described in R. Kimmel et al., "Fast Marching Method on Triangulated Domains," Proceedings of the National Academy of Science, Vol. 95, pp. 8341–8435, 1998, which is incorporated by reference herein. Unfortunately, this can lead to intersecting patch boundaries and may not respect the vertex edge ordering.

Figure 3:
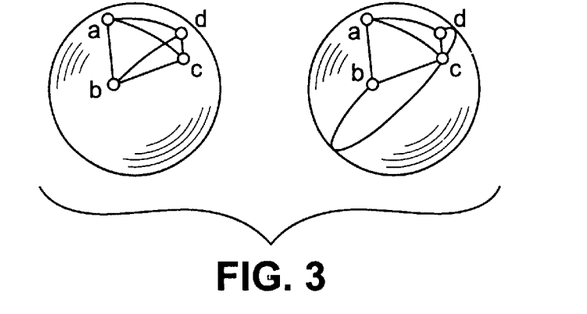
FIGS. 3 through 7 illustrate different aspects of mesh processing operations implemented in the system of FIG. 1 in accordance with the technique for generation of consistent mesh parameterizations as shown in FIG. 2.

FIG. 3 illustrates this problem, showing example patch boundaries of a sphere with four fully connected feature vertices. A naive shortest path strategy does not lead to a topologically correct net, as shown on the left side portion of the figure, violating both the intersection condition and the vertex edge ordering condition. On the right side is a topologically correct net.

To address the problem illustrated in FIG. 3, we use a restricted brush fire algorithm to trace a path between two feature vertices in a topologically equivalent manner. Patch boundary crossings are avoided by making sure that the brush fire never crosses a previously traced path. Once a feature vertex is incident to at least two traced paths, we also have to make sure that any new paths respect the rotational ordering of edges at that vertex, i.e., new paths need to be attached in the appropriate sector at both vertices. This is ensured by starting the brush fire in the correct sector at the source and only terminating when it reaches the destination in the correct sector, as will be described in conjunction with FIG. 4.

Figure 4:
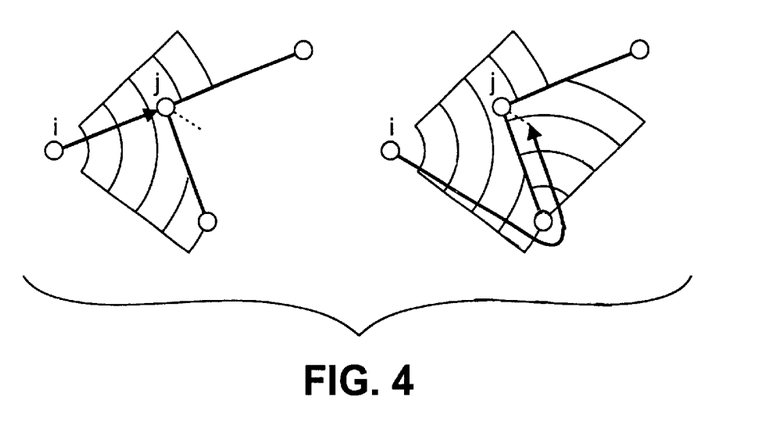

With reference to FIG. 4, in order to find a curve for edge $\{i,j\} \in L_0$, a brush fire is started at $\{i\}$. When it reaches $\{i\}$ a check is performed to see whether it reaches $\{j\}$ in the correct sector. This is not true in the example shown in the left portion of the figure. The brush fire continues and will eventually reach $\{j\}$ in the correct sector defining a topologically equivalent curve from $\{i\}$ to $\{j\}$, as shown in the example on the right. Already-drawn paths act as fire walls during the brush fire propagation.

Additionally, the order in which paths are traced is important. For a random ordering, even the restricted brush fire algorithm does not guarantee termination. For example, it is possible to "encircle" a vertex with paths, making it unreachable.

Figure 5:
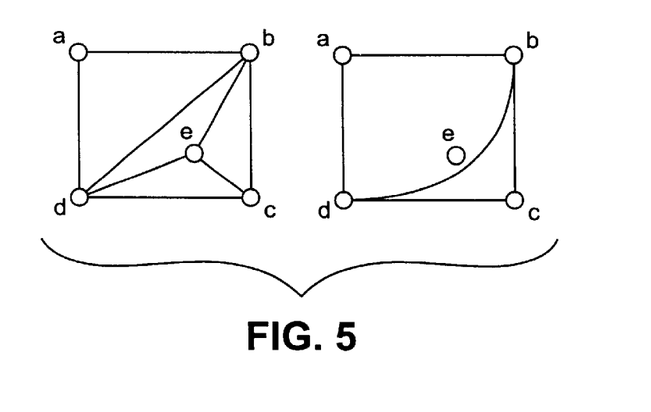

FIG. 5 shows an example of this encircling problem. The left side of the figure shows the desired base domain connectivity, while the right side shows an intermediate stage of the net construction. Because of the mesh geometry in this example, it is possible that vertex $\{e\}$ gets encircled inside the patch $\{a, b, d\}$ in the intermediate stage shown on the right, before any curves are attached to it.

To solve the encircling problem, we do not trace any paths that would complete cycles until a spanning tree of $L_0$ has been traced, where a spanning tree may be defined as a minimal set of paths that includes each vertex in $L_0$. This guarantees that no vertex can be encircled during the building of the spanning tree. Once we have the spanning tree, we can complete the net by adding the remaining patch boundaries in any order.

The foregoing assertion can be proven by showing that the completion algorithm cannot get stuck. More specifically, we prove by contradiction that completion of the net after building a spanning tree always terminates and produces a topologically equivalent net. Assume that one of the invocations of the brush fire algorithm, say for edge $\{a,$ $b\} \in L_0$, could not complete, and that this is the first such occurrence. This implies the existence of a cycle C of paths on the mesh separating $\{a\}$ from $\{b\}$, i.e., the brush fire gets "caught." Given that the mesh and base domain are both genus zero, C also splits the base domain in two regions. Since the set of already traced curves contains a spanning tree of $L_0$, it forms a connected graph, and therefore must contain a path P from $\{a\}$ to $\{b\}$. Since $\{a\}$ and $\{b\}$ are in different regions of the mesh, P and the cycle C have to cross. Curves can only cross at vertices, so P and C must cross at a subset of the vertices of P. Follow P vertex by vertex and at every intersection vertex, record whether the base domain or mesh region change. Given that neighborhood ordering has to be the same on the base domain and mesh at each vertex, region changes have to occur simultaneously on the base domain and mesh. Since $\{a\}$ and $\{b\}$ are in the same region on the base domain ($\{a, b\} \in L_0$), they have to be in the same region on the mesh. This contradicts our assumption and proves that the brush fire can always terminate in the correct sector and the net can be completed.

2.2 Tracing Fair Boundary Curves

The above-described example net tracing algorithm guarantees a topologically equivalent mapping of the base domain to the desired mesh. However, the resulting mapping could nonetheless have an undesirable level of distortion. We now present a modified net tracing algorithm that has the same correctness guarantee and attempts to ensure a fair mapping. In general, the following quality criteria are desirable:

1. Equal distribution of surface area amongst patches.
2. Smooth patch boundaries.
3. Fair patch boundaries; in particular they should not "swirl."

The first two criteria are intuitively clear and can be achieved through relaxation, using techniques such as those described in M. S. Floater, "Parameterization and Smooth Approximation of Surface Triangulations," Computer Aided Geometric Design 14, pp. 231–250, 1997, which is incorporated by reference herein. The third one is more difficult. In essence we want to avoid unnecessary "winding" or "swirling" of the curves. The swirling phenomenon leads to particularly nasty patches that cannot be fixed through relaxation.

Figure 6:
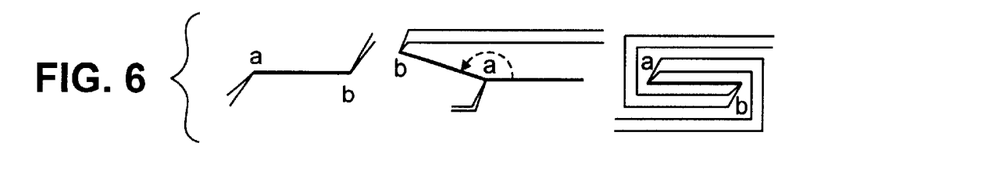

FIG. 6 illustrates the above problem using a "swirl" operator, i.e., a bijective map from a mesh onto itself. Consider two feature points a and b. Let a be the center of the swirl and now gradually let b rotate around a counterclockwise, thereby pushing any patch boundaries it encounters ahead so that the boundary curves remain topologically equivalent. Do this until b is back in its original position. Proceeding from left to right in the figure, b turns around a pushing patch boundaries ahead of itself until b comes back to its original position. This new arrangement is still topologically equivalent, though the patches now have very awkward, stretched shapes. The problem is obviously much worse if the swirl operator is applied a number of times to multiple feature vertices.

Clearly we want to avoid swirling and choose the least distorted or fairest amongst all topologically equivalent nets. Such a net can be defined as the one which achieves the global minimum of the fairness functional $$\sum_{C \in N} \int_{s \in C} \|g'\| + \|g''\| ds,$$

where the summation is over all curves C in the net N, and the integrand g is the arc length parameterization of C. This leads to a non-convex, mixed discrete-continuous global optimization problem, which seems to be intractable at this point. Instead, we exploit a number of heuristics that do not require a global solve and lead to good patch layouts in practice.

We discuss each of these algorithm modifications in turn. Note that none impact the previously-described correctness guarantee.

In preparation for path tracing we compute a parameterization of the mesh. Traced curves will try to follow isoparameter lines of this parameterization rather than the shortest paths. This has the advantage that the patch boundaries naturally repel each other, making swirling very unlikely. Each vertex of the mesh M is parameterized onto the base domain B. The parameter value of a vertex $\{i\}$ is $\pi_i$, which is an F-vector on B. The feature points $p_f$ are already associated with the coarsest level vertices $b_f$. Parameter values for the other vertices of M are computed by solving a linear system:

$$\pi_i = \sum_{j \in V(i)} w_{ij} \pi_j,$$

where $\pi_f = b_f$. The weights $w_{ij}$ are given by the Floater scheme described in the above-cited M. S. Floater reference entitled "Parameterization and Smooth Approximation of Surface Triangulations." Because these weights form a convex combination, the components of $\pi_i$ are positive and sum to 1. The linear system is solved using conjugate gradients.

Assume we want to trace the curve between points $f$ and $f'$. The main idea is to set an objective function and trace a curve along the local maximum of the objective function. The objective function at a vertex $\{j\}$ is given by $$K_j = \pi_j[f] + \pi_j[f']$$

where $[f]$ denotes the $f$-th component of an F-vector. Clearly $K_f = K_{f'} = 1$ while $0 \leq K_j < 1$ for j a non-feature vertex. The algorithm is the same as that described previously but with $K_j$ as the priority in the queue. This is similar to choosing a variable speed of propagation in the brush fire algorithm, as described in the above-cited R. Kimmel et al. reference entitled "Fast Marching Method on Triangulated Domains."

For all edges of $L_0$ we first trace corresponding tentative curves using the restricted brush fire algorithm described earlier. The constraints are given by the curves that have already been inserted into the net, where there are initially no curves inserted into the net. We record the tentative length and path of these curves and insert them into a priority queue based on length. Such a priority queue may be implemented using standard techniques well-known to those skilled in the art. Upon removal from the priority queue, during spanning tree construction, we check to see if the recorded tentative path is still valid and does not violate constraints provided by other curves recently inserted into the net. If the recorded tentative path is not topologically valid, we retrace the curve and update its priority. If it is topologically valid, we run the swirl detector illustrated in FIG. 7 from both adjacent patches. If at least one fails, we put the edge back into the queue with a penalty. If both pass we add the curve to the net.

The swirl detection process will now be described with reference to FIG. 7. Consider tracing a path for $\{a, b\} \in L_0$ with $\{a, b, c\}$ and $\{a, d, b\}$ in $L_0$. If the shortest path from $\{c\}$ to $\{a, b\}$ falls on the wrong side, as shown on the left in the figure, the triangle $\{a, b, c\}$ is considered flipped and may lead to swirls. Therefore, adding the path $\{a, b\}$ to the net is postponed. On the right in the figure, the trace reaches $\{a, b\}$ on the correct side and the path is accepted.

Figure 7:
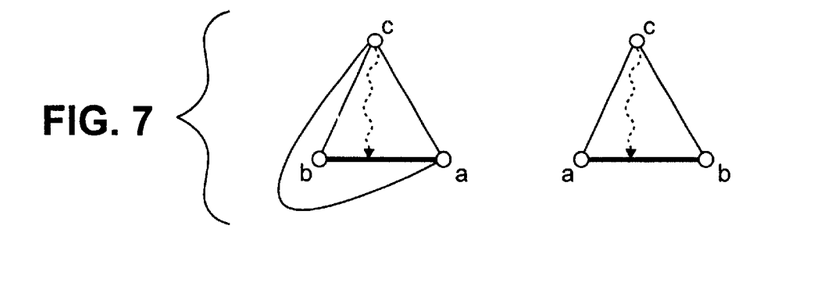

More particularly, to detect a possible swirl in the FIG. 7 example, we parametrically trace a line from $\{c\}$ to the closest point on the image of $\{a, b\}$, i.e., the first point that the brush fire meets on the path from $\{a\}$ to $\{b\}$. This path should arrive on the left side of the oriented path from $\{a\}$ to $\{b\}$, as indicated on the right in the figure. If it arrives on the wrong side, then the mapping of the triangle $\{a, b, c\}$ appears flipped. Consequently, one of the traced edges $\{a, b\}$, $\{b, c\}$ or $\{c, a\}$ would have to be routed around an opposing vertex; the traced edge $\{c, a\}$ is shown "taking the detour" on the left in the figure. These three configurations are equivalent to each other under a sequence of swirls. We can only decide which configuration is the most fair after more curves linking $\{a\}$, $\{b\}$, and $\{c\}$ to the rest of the net have been added. Therefore, we postpone tracing of $\{a, b\}$ by introducing it back into the priority queue with a penalty. The same test is applied starting from $\{d\}$.

After the spanning tree has been constructed we complete the net as before except that the priority queue based on length is used.

After tracing the patch boundaries we obtain a net of curves topologically equivalent to $L_0$. These curves are composed of segments residing on the mesh edges. The next step is to straighten the curves, allowing them to cross the interior of triangles, and ensuring that all patches have approximately equal area.

For all feature vertices $\{i\}$ all incident curves $\{i,j\}$ are straightened in a single operation. First, gather all triangles on the mesh which are interior to the image of all $\{i,j,k\} \in L_0$. This submesh of the mesh is parameterized onto a convex region in the plane as follows. Map the feature vertices $\{i\}$ belonging to V(i) to the vertices of a planar n-gon inscribed in the unit circle. The angles subtended by each side $\{j,k\}$ of the n-gon are proportional to the length of the corresponding net curves. Boundary curves $\{j,k\}$ are mapped to straight lines, assigning coordinates for the interior curve points as convex combinations of the curve endpoints. Finally, solve for the coordinates as before using the weights of the Floater scheme based on 3D geometry of the mesh. Once we have this 2D parameterization we can replace the curves $\{i,j\}$ incident to $\{i\}$ by mapping the respective 2D line segments back onto the 3D mesh. In general these lines will cut across existing triangles which must be split accordingly to maintain a valid triangulation.

For efficiency, it may be desirable to run the above-described net tracing algorithm on a simplified version of the mesh and later transfer the net to the original mesh. For the examples described herein, we utilize a simplified mesh with approximately one thousand vertices.

During path tracing we must allow multiple paths to traverse the same edge and impose an ordering on them. We do this with a special "lane" data structure which allows several paths to pass through the same mesh edge, while maintaining a conceptual epsilon interval separation between them. In effect an edge is treated as a highway with many ordered lanes. This requires a modification of the queue in the brush fire graph traversal. Ordinarily this queue controls which vertex is visited next. In our setting we must also maintain a notion of which lane the fire is traveling on to properly respect fire walls. Thus, the priority queue maintains not just vertices but vertices and their associated lanes. Those skilled in the art will recognize that other data structures may be used in place of the above-described lane data structure.

3. Examples

Figure 8:
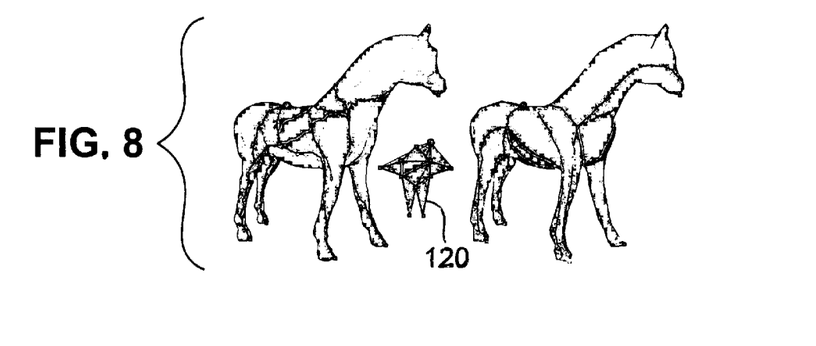
FIGS. 8 through 15 illustrate example meshes and corresponding surfaces processed in accordance with the techniques of the invention.

FIG. 8 shows the transfer of a very simple star-like patch network 120 onto a mesh representative of a horse. In this example, patch boundary curves from the star-like patch network are mapped onto the horse mesh. The star-like patch network has one vertex on its back connecting to all other vertices. On the left in the figure is the result of the previously-mentioned naive shortest path algorithm. It can be seen that several curves intersect and others pass on the wrong side of the horse mesh. For example, the white curves which are supposed to be on the belly end up using the shortest path across the back of the horse. On the right in the figure is the result of the modified net tracing algorithm of the present invention. This example also shows that we can transfer patch layouts between very dissimilar objects.

Figure 9:
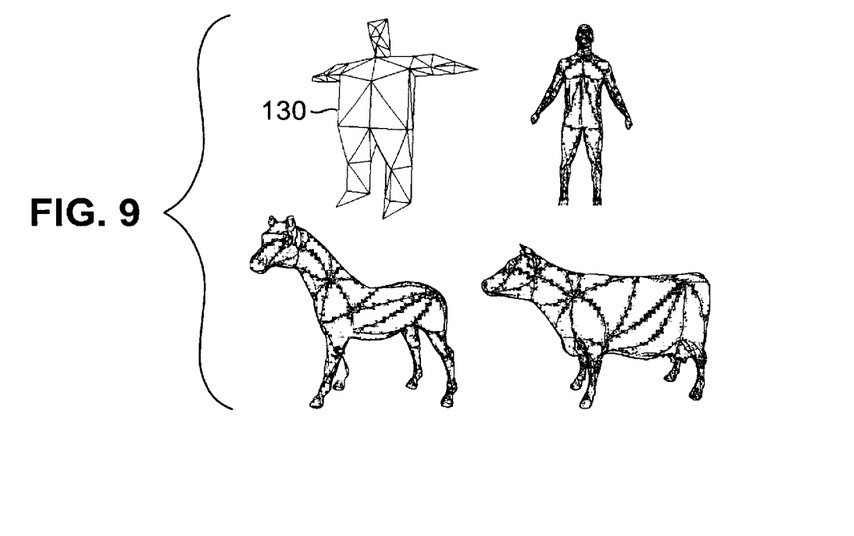

FIG. 9 shows another example, this time using a more complex patch network 130 corresponding generally to the base domain mesh 100 of FIG. 2. The patch network 130 in this example is transferred to meshes representative of a human, a horse and a cow, as illustrated in the figure. The patch network 130 is a coarse mesh having 1000 triangles, while the human, horse and cow meshes each have about 100,000 triangles. On a 900 Mhz Pentium III machine, tracing the curve net on the coarse mesh takes around 5 seconds, transferring the resulting net to a given original mesh takes 2 seconds, smoothing takes about 1.5 minutes, and remeshing to 43,000 triangles takes about 6 minutes. Selecting 54 feature vertices on the human figure, for example, takes around 10 minutes of user time.

4. Applications

As indicated previously, once a consistent parameterization has been established for several meshes, we can use the resulting correspondences for many different DGP tasks. Here we describe a few exemplary applications to indicate the variety of possible algorithms.

Figure 10:
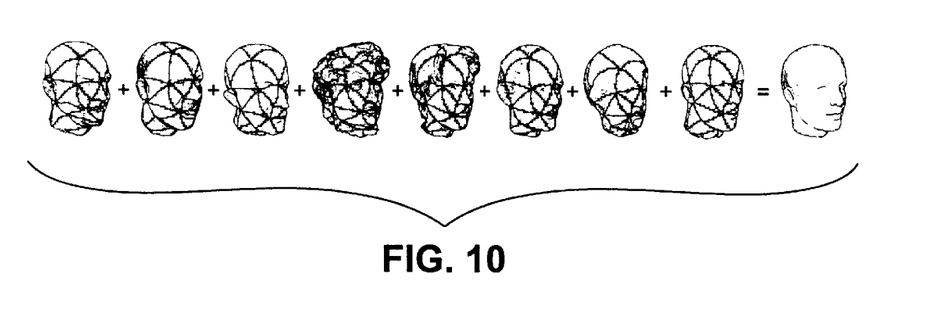
Figure 11:
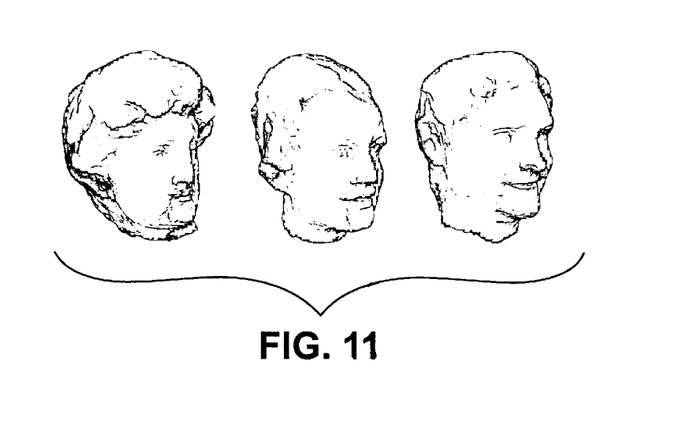
Figure 12:
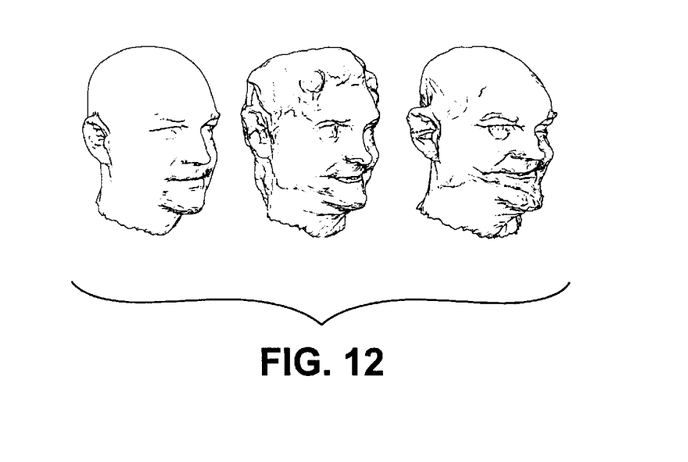

A first application, to be described in conjunction with FIGS. 10, 11 and 12, is that of principal mesh components analysis. This application is motivated by the use of principal component analysis for images. For example, given a number of images of faces that are aligned and illumination-equalized one can compute "eigenfaces," i.e., a set of orthogonal images which are eigenvectors of the variance and/or co-variance matrix of the set of face images. We can perform a similar computation with meshes.

FIG. 10 shows a number of head meshes that are all aligned through rigid body motion and scaled to equal volume. The rightmost mesh represents the mean or average of the eight meshes to its left. In general, the connectivity and sampling patterns of the original eight meshes are different and computing the average is non trivial. However, after computing consistent mesh parameterizations and remeshing in accordance with the techniques of the present invention, all eight meshes have the same connectivity and sampling pattern, so computing the average becomes a trivial operation.

FIG. 11 shows the three principal component meshes or "eigenheads" for the FIG. 10 example, each visualized in a sum with the mean. Each mesh in the original set can be characterized by its eigendecomposition. The first eigenhead seems to indicate hair on the front of the skull, the second hair on the back of the skull, and the third whether the face carries a smile. Such feature vectors can be useful in compression, recognition or database search.

FIG. 12 illustrates how the eigenheads can be used in filtering applications. The middle mesh shows the result of tripling the third eigenmode of the leftmost mesh. The rightmost mesh is the result of doubling all but the mean eigenmode of the leftmost mesh.

Figure 13:
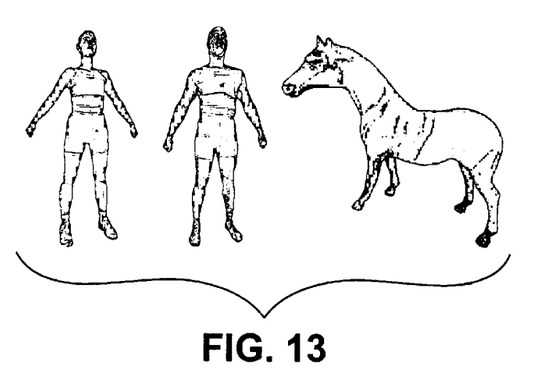

Another application of the techniques of the present invention is in the transfer of textures from one mesh to another. Given the vertex-wise correspondence between two meshes it is trivial to transfer attributes from one mesh to another through direct parametric mapping. FIG. 13 shows a simple example in which texture from the leftmost human mesh is transferred to the middle human mesh and to the rightmost horse mesh.

A further application involves the transfer of wavelet details from one mesh to another. For example, one can compute a wavelet transform of two meshes with consistent parameterizations and then perform scale dependent blending. To illustrate this idea we combine the base domain of one mesh with the wavelet coefficients from another mesh. This procedure utilized Loop-based wavelets as described in A. Khodakovsky et al., "Progressive Geometry Compression," Proceedings of SIGGRAPH 2000, pp. 271–278, 2000, which is incorporated by reference herein.

Figure 14:
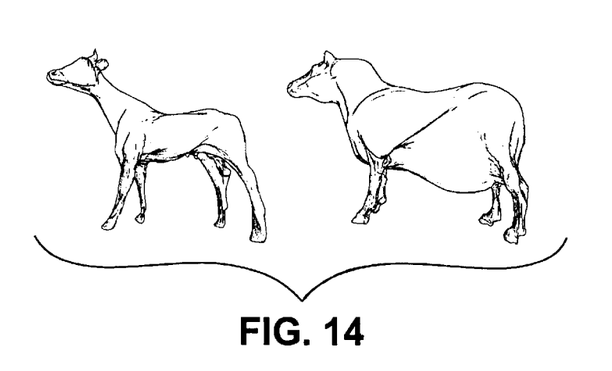

FIG. 14 on the left shows the result of combining wavelet coefficients from a cow mesh with the base domain of a horse mesh, and on the right shows the result of combining wavelet coefficients from the horse mesh with the base domain of the cow mesh. Such mappings can also be the basis for morphs with scheduled transitions in the scale domain, in a manner similar to scheduled Fourier morphing as described in J. F. Hughes, "Scheduled Fourier Volume Morphing," Computer Graphics 26, Proceedings of SIGGRAPH 92, pp. 43–46, 1992.

Yet another application is in shape blending of different meshes. For example, establishing a mapping between different shapes, which may be quite dissimilar, is the first step in any morphing application. The techniques of the present invention can be used to establish the necessary mapping even when there are multiple meshes to be blended. Consequently, n-way blends of free-form meshes are greatly facilitated.

Figure 15:
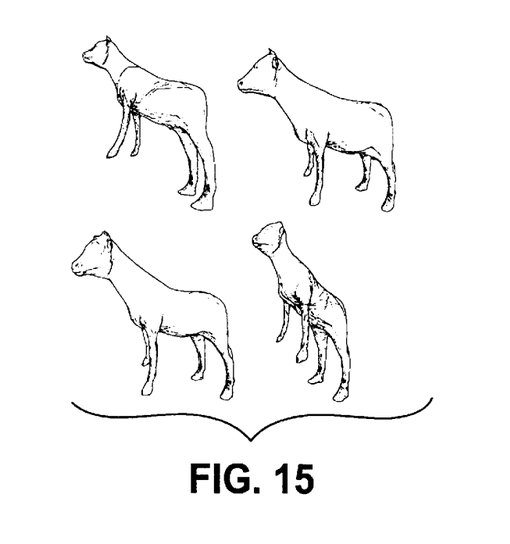

FIG. 15 shows an example of various affine combinations of cow, horse, and human figure meshes. The top left is an average of the three, the top right is 50% cow, 25% human and 25% horse, the bottom left is 50% horse, 25% human and 25% cow, and the bottom right is 50% human, 25% horse and 25% cow.

It should be understood that the foregoing are just examples of DGP applications that are facilitated by the techniques of the present invention. Other applications include animation and transfer of animation controls from one shape to another, computing principal components for a large database of meshes and using them for search and recognition, code design for efficient compression of multiple shapes, consistent watermarking and authentication, etc.

The above-described embodiments of the invention intended as illustrative only, and should not be construed as limiting the invention. For example, the assumptions regarding genus, boundaries, feature point or line specifications, constraints, etc. are made for simplicity and clarity of illustration. The invention can be configured in other embodiments to handle higher-genus meshes, missing feature point specifications, and additional or other types of boundaries or constraints.

Although in the illustrative embodiments the consistent parameterizations all share exactly the same base domain, it is expected that in other embodiments of the invention there may be some minor variation between the base domains of the parameterizations. Base domains having such variations relative to one another are intended to be included within the term "substantially the same base domain" as used herein. Similarly, with regard to the connectivity of a net of paths generating by a net tracing algorithm, such connectivity need not be exactly the same as that of the base domain, but could instead be substantially the same as that of the base domain.

In addition, the particular data structures described herein are by way of example only. For example, the priority queue data structure and lane data structure referred to herein may be replaced with other types of data structures known to those skilled in the art.

Moreover, the particular net tracing algorithm steps described herein are exemplary, and one or more of the steps may be modified or otherwise reconfigured.

It should also be noted that the described techniques may be applied locally within a set of meshes to particular regions of interest within those meshes, e.g., regions corresponding to a face, head, or other body part in each mesh, rather than to an entire mesh. In this case, the connectivities of the paths generated by the net tracing algorithm need be substantially the same as that of the base domain in only the region of interest. Such regions of interest are more generally referred to herein as "portions" of a given mesh. The described techniques may be extended to such mesh portions in a straightforward manner.

These and numerous other alternative embodiments within the scope of the following claims will be apparent to those skilled in the art.

We claim:

1. A method of processing a set of meshes, each mesh comprising data points representative of a corresponding surface, the method comprising the step of:
    generating consistent parameterizations for the meshes, the consistent parameterizations each having substantially the same base domain for at least a portion of the corresponding mesh;
    wherein the generating step utilizes a net tracing algorithm which involves determining for each of the meshes a net of paths having a connectivity substantially the same as that of the base domain within at least the portion of the corresponding mesh.

2. The method of claim 1 wherein each of the meshes is a triangular mesh comprising a plurality of triangles having vertices corresponding to data points.

3. The method of claim 1 wherein the base domain is user specified.

4. The method of claim 1 wherein the base domain is computed automatically by applying a parameterization algorithm to a selected one of the meshes.

5. The method of claim 1 wherein the consistent parameterizations share a plurality of designated features comprising at least one of points and edges, from each of the corresponding meshes, that are also present in the base domain.

6. The method of claim 5 wherein at least a subset of the designated features are user specified.

7. The method of claim 5 wherein at least a subset of the designated features are detected by automatic feature recognition.

8. The method of claim 1 further including the step of utilizing the consistent parameterizations to generate a remesh for each of the meshes.

9. The method of claim 8 wherein one or more of the remeshes are supplied as input to a digital geometry processing algorithm.

10. The method of claim 8 wherein one or more of the remeshes each comprise a semi-regular remesh.

11. The method of claim 8 wherein each of the remeshes has an identical connectivity.

12. The method of claim 1 wherein the base domain comprises a triangular mesh, each triangle in the base domain corresponds to a patch on each of the meshes, and each edge in the base domain corresponds to a patch boundary on each of the meshes.

13. The method of claim 1 wherein the nets of paths define patch boundaries on each of the meshes, and the net tracing algorithm is configured such that a given pair of patch boundaries in a given one of the meshes intersect only at a feature vertex, and each feature vertex has a consistent rotational ordering of its edges in both the base domain and the mesh.

14. The method of claim 1 wherein the net tracing algorithm determines a path between two feature vertices in a topologically equivalent manner by ensuring that the determined path does not cross any previously traced path, and that once a feature vertex is incident to at least two traced paths, the determined path respects a rotational ordering of edges at that vertex and is attached in an appropriate sector at both its source and destination vertex.

15. The method of claim 1 wherein the net tracing algorithm is configured such that no paths that would complete cycles are traced until a spanning tree of the base domain has been traced, thereby ensuring that no vertex of a given mesh can be encircled by paths.

16. The method of claim 1 wherein the net tracing algorithm in determining a path to connect two data points in a given mesh traces the path along a local maximum of a specified objective function.

17. The method of claim 1 wherein the net tracing algorithm as applied to a given one of the meshes comprises the steps of:
    for each edge in the base domain, determining a tentative path for use in the net of paths corresponding to the mesh;
    prioritizing the tentative paths based on length;
    utilizing selected ones of the tentative paths to construct a spanning tree of the base domain;
    performing one or more swirl detection operations as part of the spanning tree construction, the results of the swirl detection operations being utilized in selecting particular ones of the tentative paths for use in the spanning tree;
    completing the net of paths by adding one or more additional paths to the spanning tree; and
    straightening one or more of the paths of the net.

18. The method of claim 1 wherein the net tracing algorithm for a given one of the meshes is initially run on a simplified version of the mesh and the resulting net of paths is subsequently transferred to the mesh.

19. An apparatus for processing a set of meshes, each mesh comprising data points representative of a corresponding surface, the apparatus comprising:

a memory for storing at least a portion of at least one of the meshes; and at least one processor coupled to the memory and operative to generate consistent parameterizations for the meshes, the consistent parameterizations each having substantially the same base domain for at least a portion of the corresponding mesh;

wherein the generating operation utilizes a net tracing algorithm which involves determining for each of the meshes a net of paths having a connectivity substantially the same as that of the base domain within at least the portion of the corresponding mesh.

20. A machine-readable storage medium for storing one or more programs for use in processing a set of meshes, each mesh comprising data points representative of a corresponding surface, wherein the one or more programs when executed implement the step of:

generating consistent parameterizations for the meshes, the consistent parameterizations each having substantially the same base domain for at least a portion of the corresponding mesh;

wherein the generating step utilizes a net tracing algorithm which involves determining for each of the meshes a net of paths having a connectivity substantially the same as that of the base domain within at least the portion of the corresponding mesh.

* * * * *

UNITED STATES PATENT AND TRADEMARK OFFICE
CERTIFICATE OF CORRECTION

PATENT NO. : 6,831,638 B2
DATED : December 14, 2004
INVENTOR(S) : E.C. Praun et al.

It is certified that error appears in the above-identified patent and that said Letters Patent is hereby corrected as shown below:

Title page,
Item [56], References Cited, U.S. PATENT DOCUMENTS, add the following:
-- 6,285,372   9/4/01   Cowsar et al. --
OTHER PUBLICATIONS, add the following:
-- A. Lee et al., "Multiresolution Mesh Morphing," Preceedings of SIGGRAPH '99, pp. 343-350, 1999.

S. Marschner et al., "Modeling and Rendering for Realistic Facial Animation," Rendering Techniques 2000: 11th Eurographics Workshop on Rendering, pp. 231-242, 2000. --

Signed and Sealed this

Fifteenth Day of March, 2005

JON W. DUDAS
*Director of the United States Patent and Trademark Office*